UNITED STATES PATENT OFFICE.

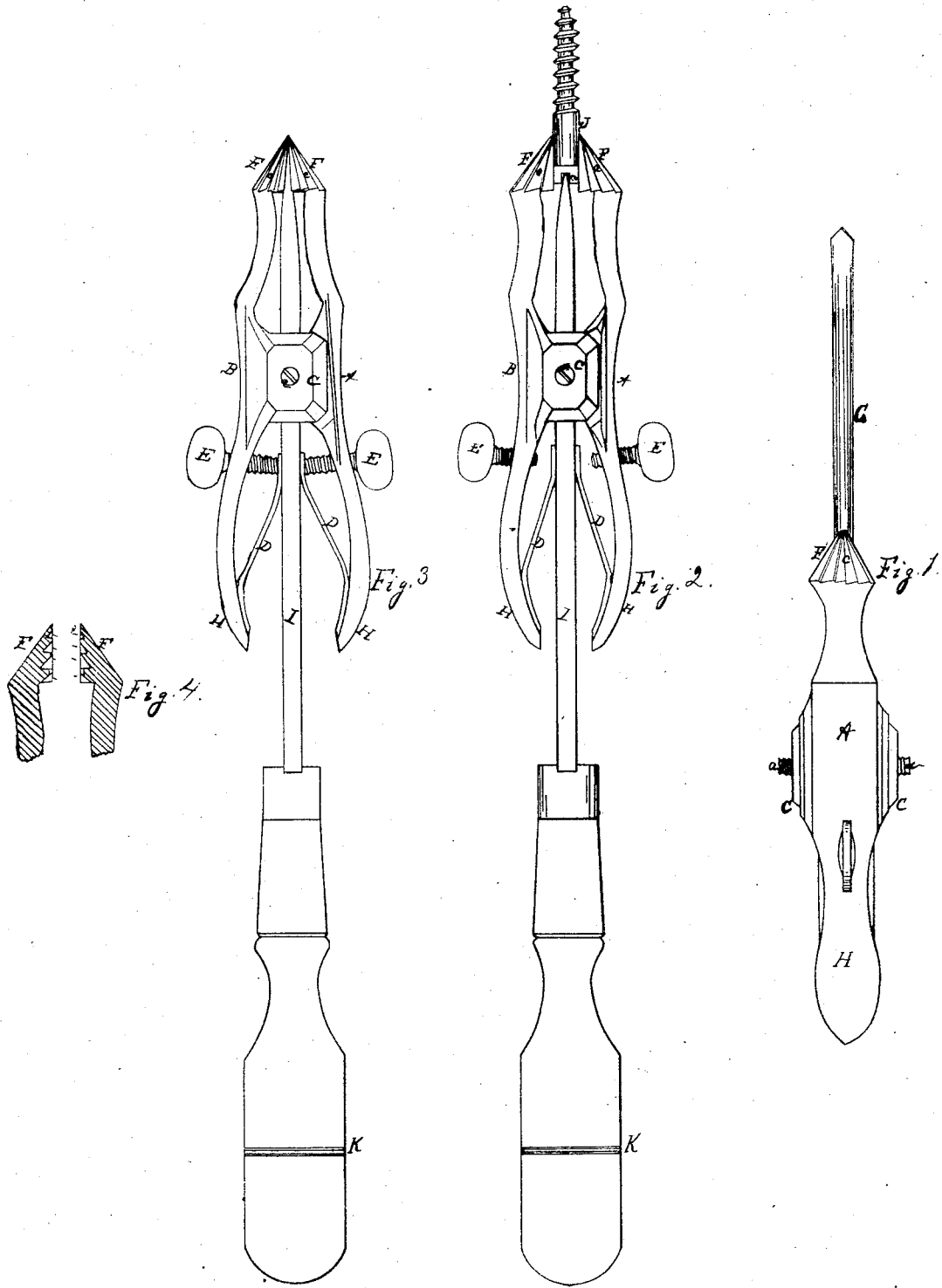

JOHN W. MARSH, OF OXFORD, MASSACHUSETTS.

IMPROVEMENT IN COMBINATION-TOOLS.

Specification forming part of Letters Patent No. 76,218, dated March 31, 1868.

*To all whom it may concern:*

Be it known that I, JOHN W. MARSH, of Oxford, in the county of Worcester and Commonwealth of Massachusetts, have invented certain new and useful Improvements in Combined Screw and Drill Holder and Countersink; and I do hereby declare that the following is a full, clear, and exact description of the same, reference being had to the accompanying drawings, forming a part of this specification, in which—

Figure 1 represents a top view of my improved device when arranged for holding a drill. Fig. 2 represents a side view of the device when arranged for holding a screw and screw-driver. Fig. 3 represents a side view of the same device when arranged for making countersinks; and Fig. 4 represents a longitudinal central section of the jaws which hold the screw, as seen in Fig. 2, and by which the countersink is made when the parts are arranged as shown in Fig. 3 of the drawings.

To enable those skilled in the art to which my invention belongs to make and use the same, I will proceed to describe it more in detail.

In the drawings, the parts marked A B are fitted and hinged together at the points $a b$. The part B is made with two central ears or projections C C, between which similar central ears or projections on the part A work, the two parts being held together by the screws or pivots $a b$, as before indicated. To the insides of the rear ends of the parts A and B are fastened the springs D D, the inner ends of which are bent out straight to receive the ends of the thumb-screws E E, as shown in Fig. 3.

The front ends F F of the parts A and B are made in conical form upon their outer surfaces, which surfaces are also grooved out longitudinally, as shown at $c$, to form cutting-edges, by which countersinks can be cut when the parts are used in the positions shown in Fig. 3. The insides of the ends F F are provided with a series of notches 1. These notches are made of different sizes to receive and hold securely the heads of different-sized screws.

The operation is as follows: When the device is to be used for holding a drill G, the screws E E are turned back sufficiently to admit the rear end of the drill (which for convenience should be made flat) between the ends of the springs D D, when the screws are turned in against the ends of the springs until they press firm upon the drill, when the rear ends H H of the parts A and B will be forced apart and their forward ends F F in upon the drill, which is thereby held securely, as shown in Fig. 1. Again, when the device is to be used for holding screws, as shown in Fig. 2, screws E E are turned back, so that the ends F F can be opened sufficiently to receive the head of the screw into one of the series of notches 1, as shown in Fig. 2, when the screw-driver I is inserted between the springs D D and the point $e$ inserted in the slot in the head of the screw, as shown in Fig. 2, after which the screws E E may be turned in upon the springs D D and screw-driver I, thereby causing the screw-driver and the screw J to be both held securely in place. The operator can now by means of the handle K enter the screw and turn it in with ease. After the screw has been turned in until the points of the ends F F strike, screws E E are turned back, as shown in Fig. 2, to enable the operator to open the jaws or ends F F and slip the holding device back upon the blade I when the screw is run in.

The springs D D of themselves hold the device quite securely to the blade I, and, if preferred, side springs may be attached to the ears C C or to the ears upon the parts A, for the purpose of keeping the driver-blade I in a central position. If preferred, a curved slot may be made in one of the ears to the part B and a screw inserted through said slot, so as to screw into the ear attached to the part A, for the purpose of holding the ends or jaws F F in any desired position when once adjusted.

It will be seen that with my combined screw and drill holder and countersink that a hole can be drilled and a countersink made or a screw inserted in a very easy and expeditious manner; and it will be furthermore understood that the same operations can be performed with my improved device in many positions in which it would be difficult to perform the same operations with the devices in common use.

It will be understood that the device may be used with good effect for holding, entering, and running in screws when used as shown in Fig. 2, the springs D D being all sufficient to hold the device to the screw-driver blade I without the employment of the screws E E, the latter being employed only when a very rigid connection is desired between the holding device and the blade I.

Having described my improved screw and drill holder and countersink, what I claim therein as new and of my invention, and desire to secure by Letters Patent, is—

1. The combination of the jaws A B, provided with externally-grooved conical ends F, with the springs D and set-screws E, the said parts being constructed and arranged, as herein described, so as to constitute a combined drill-holder and countersink.

2. The combination, with the jaws A B, whose ends F are provided interiorly with notches 1 for receiving and holding the head of the screw, of the springs D, with or without set-screws E, by which the screw-driver placed between the jaws is steadied and held, the said parts being constructed and arranged for operation as herein shown and set forth.

J. W. MARSH.

Witnesses:
 THOS. H. DODGE,
 D. L. MILLER.